Patented Apr. 10, 1951

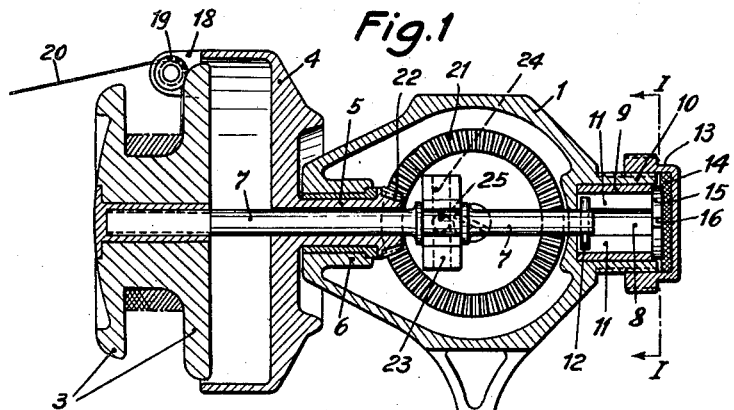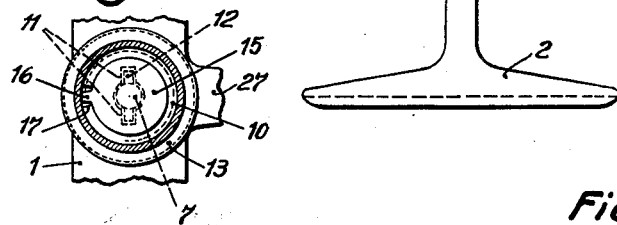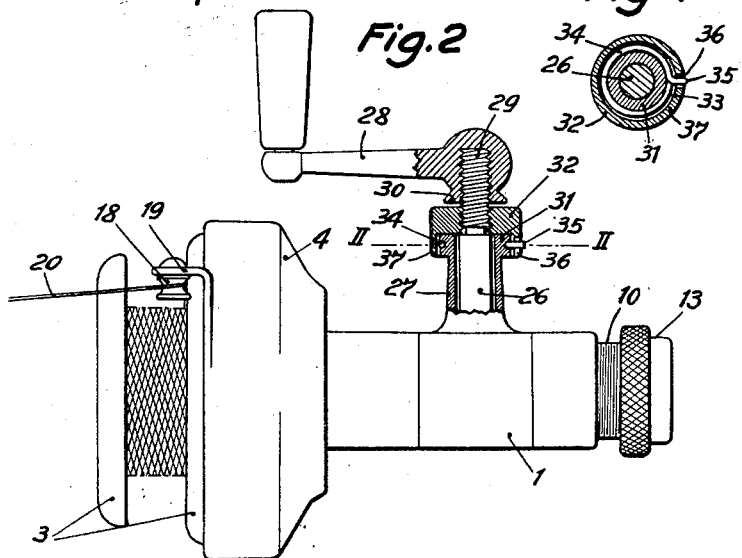

2,548,073

UNITED STATES PATENT OFFICE 2,548,073

BRAKING ARRANGEMENT FOR CASTING REELS

Karl Siegrist, Zurich, Switzerland

Application April 19, 1946, Serial No. 663,461
In Sweden November 7, 1945

6 Claims. (Cl. 242—84.5)

This invention relates to improvements in long range casting reels of the type provided with braking means for regulating the winding up and paying out of the line.

The object of the invention is to provide a reel structure having two independent braking means, one automatically adjustable and directly associated with the crank of the reel and the shaft of said crank, and the other manually adjustable and associated with the shaft that carries the line reel.

A further object is so to locate the braking means as to preclude the possibility of having the line come in contact with the hand of the operator during manipulation of the reel.

In prior art long range automatic line-feed fishing rod casting reels, the frictional brake for the reel is disposed on the front side thereof. Such arrangement however has been found to possess drawbacks. The friction of the line reel brake must be constantly altered and adapted to the prevailing phase of the fight as the fish is being played and in proportion to the size and fighting strength of the hooked fish, so that, in attempting to regulate the brake, the hand of the fisherman usually comes in contact with the line.

This drawback is obviated by the present invention. In accordance with the invention this is accomplished by disposing the line brake on the side of the casting reel casing lying axially opposite the line reel, for which purpose a brake cylinder or sleeve regulated by means of an adjustable friction member is rotatably journaled at this side of the casing, the line reel shaft being rotatably associated with said cylinder while preserving axial movability of said shaft.

The crank used for winding the line is preferably disposed on the shaft of the drive gear, an engageable and disengageable pay-out brake being interposed between the crank and the shaft.

An embodiment of the invention is shown in the drawing, where:

Fig. 1 is a longitudinal section of the casting reel.

Fig. 2 is a top view of Fig. 1, partly in section.

Fig. 3 is a cross section taken on line I—I of Fig. 1, and

Fig. 4 is a cross section taken on line II—II of Fig. 2.

Referring to the drawing, 1 designates the gear casing of the casting reel which latter is adapted to be attached to the fishing rod by means of the foot 2 in the usual manner. The numeral 3 designates the line reel, and 4 a shield flier for protecting the line reel, said shield including a hollow shaft portion 5 rotatably journaled in a bearing portion 6 of the casing 1. The line reel 3 is carried by a shaft 7 journaled in the aforesaid hollow shaft 5 and the rear end of shaft 7 is guided in the guide bore 8 of a brake cylinder 9. The latter is rotatably journaled in a neck-like extension 10 of the casing 1 and its guide bore 8 is provided with longitudinal grooves 11. The shaft 7 is longitudinally displaceable in the guide bore 8 and carries a cross-pin 12 at its end, the ends of said pin engaging in the longitudinal grooves 11, thus serving to maintain the shaft 7 rotatably associated with the brake cylinder 9. The numeral 13 designates a knurled closure cap that is screwed upon the neck 10, said cap bearing against a friction disk 15, an elastic insert 14 being provided between the cap 13 and said disk 15. The friction disk 15 in turn bears against the brake cylinder 9 and a lug 16 on disk 15 engages in a slot 17 in the neck 10 of the casing (see Fig. 3) so as to prevent the disk 15 from rotating. A guide roller 18 is journaled on a support 19 at the front edge of the shield 4, so that when the shield 4 rotates, the roller 19 will carry the line 20 around the non-rotating line reel 3.

The shield 4 is driven by a driving bevel gear 21 which meshes with a bevel pinion 22 carried by the hollow shaft 5 of the shield 4. A crank-slide 23 is disposed on the shaft 7 and a crank-pin 25 carried by the gear 21 engages in the slide groove 24 of said crank-slide 23. As the gear 21 rotates, the crank-slide 23 serves to effect axial reciprocation of the line reel 3 and the bevel gears 21, 22 serve to rotate the shield 4 so that the line 20 will become wound in criss-cross fashion on the line reel 3. When the line 20 is being unwound, it passes over the guide roller 18 and the line reel 3 will rotate by overcoming the friction of the brake cylinder 9 which rotates along with shaft 7. The amount of friction produced by the brake cylinder, that is, the resistance interposed to prevent rotation of the line reel may be regulated as desired by drawing up the cap nut 13 to a greater or lesser extent.

The gear 21 is carried by a shaft 26 rotatably journaled in a bearing 27 on the casing 1 and is operated by a crank 28 screwed onto the threaded portion 29 of shaft 26. A brake disk 32 is disposed between the abutment surface 30 of crank 28 and a flange-like head 31 of the bearing 27, said brake disk being suitably threaded and carried by the screw thread 29. A slip spring 34 is frictionally carried in an annular channel 33 of the flange-like head 31, a portion of said spring being bent off at right angles as at 35 and engaging in a slot 36 in the flange 37 of the brake disk 32 that overhangs the flange-like head 31.

When the crank 28 is rotated in the forward direction, the brake disk 32 which is subjected to the friction of the slip spring 34, will be moved against the abutment surface 30 of the crank by the action of the thread 29 and the brake disk 32 will turn along with the crank. When the crank 28, and hence the shield 4, is rotated in the opposite direction, the brake disk 32, which is subjected to the friction of the slip spring 34, will be moved in the opposite direction by the action of the thread 29, that is, it will be urged towards the flange-like head 31, and will be pressed tightly against said head and thus function as a means for blocking rotation or acting as a pay-out brake.

Release of the pay-out braking action can be effected by so tightly applying the brake disk 32 against the abutment surface 30, as by causing it to turn on the thread 29, as to cause the friction of the brake disk 32 on the thread to be greater than the friction of the slip spring 34 that rotates with the brake member. Consequently the brake disk will rotate with the crank and the pay-out brake will become disengaged. The pay-out brake is engaged when the fish strikes or is being played. Engagement of the pay-out brake serves to prevent the fish from racing away with hook and line in unretarded fashion.

What is claimed is:

1. In a casting device for a fishing rod, the combination of a housing attachable to the rod; a hollow shaft journaled in said housing; a spindle journaled in said shaft and movable axially of said shaft; a line reel mounted on one end of said spindle; a sleeve about the other end of said spindle and journaled in said housing; a slot-and-pin connection between said spindle and said sleeve for unitary rotation and relative axial movement of said spindle and said sleeve; and braking means for said sleeve, comprising a plate adjustably mounted on said housing for non-rotatable movement, and means for moving said plate axially relative to said sleeve.

2. In a casting device for a fishing rod, the combination of a housing attachable to the rod, a hollow shaft journaled in said housing, a spindle journaled in said shaft and movable axially thereof, a line reel mounted on said spindle, means on said hollow shaft for winding line on said reel, a drive gear for said winding means, a drive shaft driving said gear, a bearing on said housing journalling said driving shaft, said bearing having an annular groove therein, a crank for operating said driving shaft, a pay-out brake on said driving shaft including a brake disk having a slot therein, and a slip member acting on said brake comprising an open resilient slip ring frictionally carried on said annular groove and having one end extending at an angle and engaged in said slot in said brake disk.

3. A casting device for a fishing rod including a housing adapted for attachment to a rod, a hollow shaft journalled in said housing, a spindle journaled within said shaft and movable axially thereof, a line reel mounted on said spindle, means on said shaft for winding the line upon said reel, said housing having a bearing thereon, drive means for driving said winding means including a drive shaft journaled in said bearing and having a threaded portion extending exteriorly thereof, a crank secured to said threaded portion in spaced relation to said bearing, said crank and said bearing having opposed abutment surfaces and the threaded portion of said drive shaft being of such length that at least a portion thereof extends between the respective abutment surfaces, a pay-out brake on said drive shaft, a slip member acting on said brake, said brake comprising a disk having a threaded aperture therein, said disk being adjustably mounted on the threaded portion of said drive shaft between said abutment surfaces, said slip member being disposed on said bearing and adapted to exert friction on said disk, so that when said reel is rotated in one direction said brake disk rotates with said crank and is urged against the abutment surfaces on said crank by the friction of said slip member and the threaded engagement between said disk and said shaft and when said reel is rotated in the other direction said brake disk is urged tightly against the abutment surface on said bearing by the friction of said slip member and the said threaded engagement so as to effect a pay-out braking action, the disengagement of said pay-out brake being effected by rotating said disk on said threaded portion of said drive shaft relative to said crank to frictionally urge the disk against the abutment surface on said crank so that the friction of the brake disk on the threaded portion of the drive shaft exceeds the friction action of said slip member.

4. In a casting device for a fishing rod, a housing adapted for attachment to a rod, a hollow shaft journaled in said housing, a spindle journaled within said shaft and movable axially thereof, a line reel mounted on one end of said spindle, a sleeve about the other end of said spindle, means on said housing for journalling said sleeve, a mechanical connection extending between said spindle and said sleeve for coupling the sleeve to the spindle for rotation therewith while permitting relative axial movement of the spindle with respect to the sleeve, braking means for said sleeve comprising a plate adjustably mounted on said housing for non-rotatable axial movement relative thereto, means for moving said plate axially relative to said sleeve to engage the same to brake the rotation of the sleeve and thereby the spindle, means carried by said hollow shaft for winding line upon said reel, drive means for driving said winding means including a drive shaft, a crank for operating said driving shaft, a pay-out brake on said driving shaft, and a slip member acting on said brake.

5. A casting device for a fishing rod including a housing adapted for attachment to a rod, a hollow shaft journaled in said housing, a spindle journaled in said shaft and movable axially thereof, a line reel mounted on one end of said spindle, a sleeve about the other end of said spindle, said housing having a bearing journalling said sleeve, means extending between said spindle and said sleeve for coupling the same for unitary rotation while permitting relative axial movement of the spindle with respect to the sleeve, brake means for said sleeve comprising a plate adjustably mounted on said housing for non-rotational axial movement relative to said sleeve, means for moving said plate axially relative to said sleeve, a flier carried by said hollow shaft for winding line upon said reel, drive means for said flier including a driving shaft mechanically connected to said flier for rotating the same, and means operably connected between said drive shaft and said spindle for reciprocating the spindle and thereby the reel while the flier is rotating.

6. In a casting device for a fishing rod, a housing adapted for attachment to a rod, a hollow shaft journaled in said housing, a spindle journaled within said shaft and movable axially thereof, a line reel mounted on one end of said spindle, a sleeve about the other end of said spindle, means on said housing for journalling said sleeve, a mechanical connection extending between said spindle and said sleeve for coupling the sleeve to the spindle for rotation therewith while permitting relative axial movement of the spindle with respect to the sleeve, braking means for said sleeve comprising a plate adjustably mounted on said housing for non-rotatable axial movement relative thereto, means for moving said plate axially relative to said sleeve to engage the same to brake the rotation of the sleeve and thereby the spindle, means carried by said hollow shaft for winding line upon said reel, drive means for driving said winding means including a drive shaft, said casing having a bearing projecting therefrom and journalling said drive shaft, said drive shaft extending exteriorly of the bearing, a crank attached to said drive shaft in spaced relation to said bearing, a brake disk mounted on said drive shaft between said crank and said bearing and movable axially of the drive shaft in dependence upon the direction of rotation of said reel to engage either said crank or said bearing, said disk constituting a pay-out brake for said drive shaft and also having a slot provided therein, said bearing having an annular groove therein and an open resilient slip ring frictionally carried in said groove and having one end extending at an angle and disposed in the slot in said brake disk and said ring constituting a slip member acting on said brake disk.

KARL SIEGRIST.

REFERENCES CITED

The following references are of record in the file of this patent:

UNITED STATES PATENTS

| Number | Name | Date |
| --- | --- | --- |
| 2,182,423 | Cabassa | Dec. 5, 1939 |
| 2,229,470 | Pezon | Jan. 21, 1941 |
| 2,271,883 | Bannister | Feb. 3, 1942 |
| 2,306,259 | Khoenle | Dec. 22, 1942 |

FOREIGN PATENTS

| Number | Country | Date |
| --- | --- | --- |
| 367,732 | Great Britain | Feb. 25, 1932 |
| 834,358 | France | Nov. 18, 1938 |